United States Patent

[11] 3,550,900

| [72] | Inventor | Kenneth C. Rolin<br>Lake Villa, Ill. |
|---|---|---|
| [21] | Appl. No. | 746,434 |
| [22] | Filed | July 22, 1968 |
| [45] | Patented | Dec. 29, 1970 |
| [73] | Assignee | Pharma Tech, Division of G & M Metal<br>Fabricators Corporation<br>Franklin Park, Ill. |

[54] FLOW REGULATOR
10 Claims, 6 Drawing Figs.

[52] U.S. Cl. .................................................. 251/9,
24/134
[51] Int. Cl. ................................................. F16k 7/06
[50] Field of Search .......................................... 128/346;
251/4, 6—10; 24/134, 134E, 134E1, 132Hal

[56] References Cited
UNITED STATES PATENTS

| 653,629 | 7/1900 | Schneider ..................... | 251/6 |
| 2,865,038 | 12/1958 | Versteeg ....................... | 251/9X |
| 2,935,088 | 5/1960 | Thompson et al. ........... | 251/8X |
| 3,102,710 | 9/1963 | Dresden ....................... | 251/9 |
| 3,171,184 | 3/1965 | Posse ............................ | 251/9X |

FOREIGN PATENTS

| 202,470 | 8/1923 | Great Britain ................ | 251/9 |

*Primary Examiner*—William F. O'Dea
*Assistant Examiner*—Richard Gerard
*Attorney*—Alexander and Speckman ABSTRACT: A one-piece, continuously variable, lever action flow regulator for controlling flow of liquid or gas through compressible resilient tubing. The flow regulator of my invention is particularly well suited for controlling the flow of fluids injected into the body, such as intravenous administrations.

PATENTED DEC 29 1970

INVENTOR
KENNETH C. ROLIN

BY Alexander E. Speckman

Attys

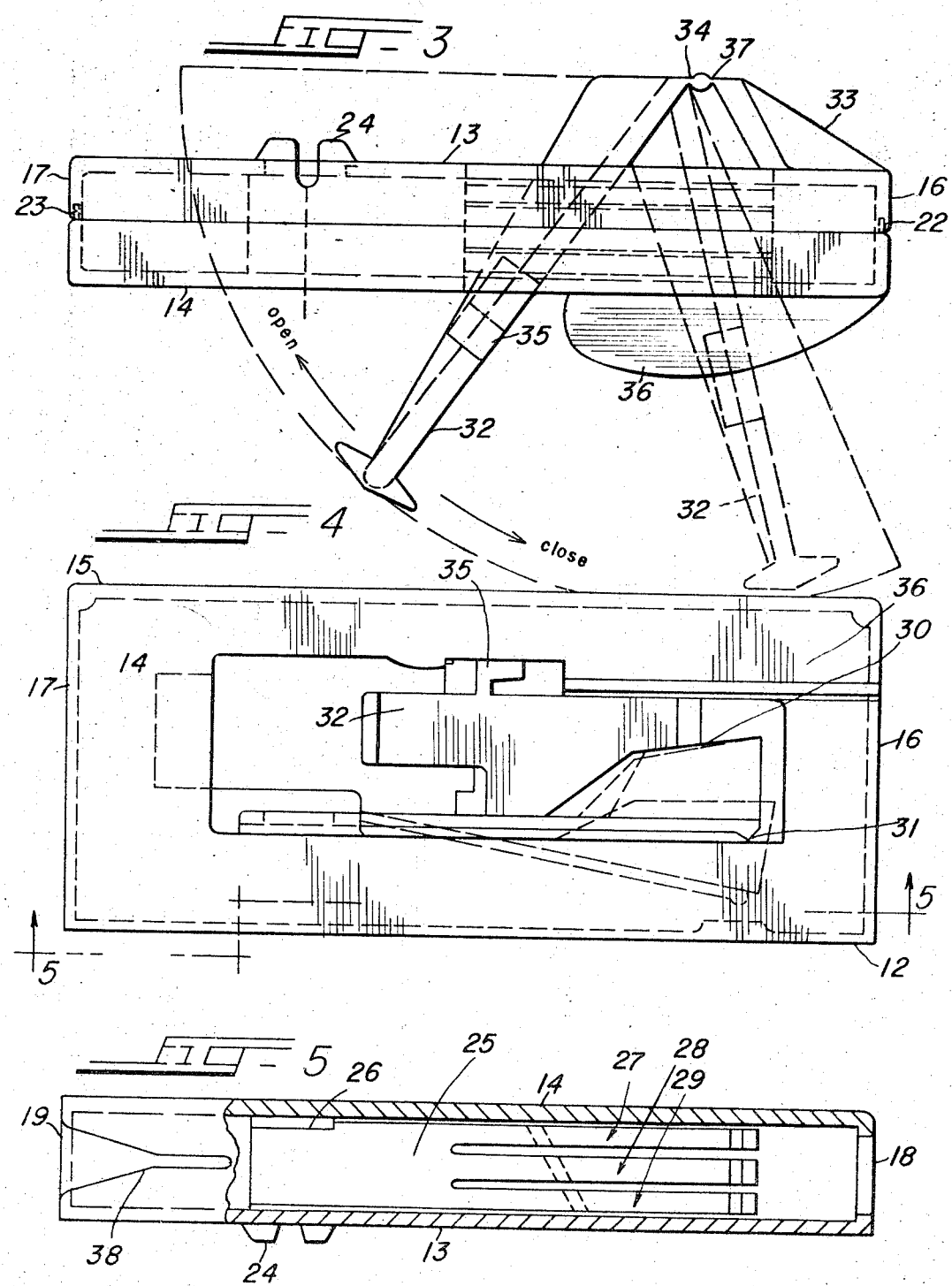

FLOW REGULATOR

BACKGROUND OF THE INVENTION

Various methods for controlling the flow of liquids or gases in compressible tubes have previously been practiced, but none of these methods proved entirely satisfactory. Most of the prior art devices are comprised of several moving parts resulting in expensive assembly operations. A further disadvantage of most of the prior art devices is that the tubing must be threaded through the device prior to attachment of bottles, needles, and the like to the ends of he tubing.

One prior art device comprises flat rigid plates having a slot with portions of varying width through which the tube is passed. Desired constriction of the tube is effected by the positioning of the tube in the portion of the slot having the desired width. Such regulators have the serious fault of difficulty of accurate regulation and inability to positively retain the tube in the position selected. Further, such devices require the use of two hands of the person operating them.

Another flow control regulator known in the art is the roller clamp which is essentially a knurled roller movably trunnioned in a tube-way, the roller being positioned relative to an inclined wall to result in varying degrees of compression in the tubing. However, one principal drawback of the roller clamp is the tendency of the setting of the clamp to drift, that is, the shifting of the roller, and always to a position permitting greater fluid flow.

Another flow control clamp presently in use comprises a hand screw threaded to a mount and employed to compress the compressible tube. Many such devices are fabricated inexpensively of plastic, in which case the threads of the screw tend to strip with the result that the screw is apt to go off center, relative to the tube, and not to shut off or regulate the flow through the tube uniformly with the desired rotation of the screw. Another serious disadvantage of screw type flow control regulators is that they severely deform the resilient tubing and due to the "cold flow" characterstics of the tubing material cause the cross section area of the lumen to change size, thus modifying the flow of liquid therein:

DESCRIPTION OF THE INVENTION

My invention comprises a novel one-piece, continuously variable, lever action flow regulator for controlling the flow of liquid or gas through compressible resilient tubing. More particularly, the device of my invention comprises a body having a passage for compressible resilient tubing therethrough, a pressure finger having one end pivotally mounted within the body and having one surface forming a wedge decreasing in thickness toward the pivotally mounted end and an opposite surface for contacting and depressing the tubing against the body, and a lever pivotally mounted to the body so that arcuate movement of the lever contacts the wedge surface depressing the finger onto the tubing adjacent the body, thereby controlling the aperture size of the tubing.

It is an object of my invention to provide a continuously variable flow regulator.

It is a further object of my invention to provide a flow control regulator which may be applied to or removed from compressible tubing without the necessity of slipping the tubing through such regulator.

It is still another object of my invention to provide a flow control regulator which is accurately and easily operated with one hand.

It is another object of my invention to provide a flow control regulator which automatically preforms resilient tubing for more accurate flow control as the flow rate decreases.

Another object is to provide a low cost plastic flow control regulator of simplified one-piece construction, greatly eliminating assembly operations.

Another object is to provide a flow control regulator for compressible resilient tubing which will not cut the tubing and minimizes deformation thus minimizing problems caused by "cold flow" of the tubing.

It is a further object of my invention to provide a flow control regulator of low cost plastic material which can be sterilized.

Another object is to provide a flow control regulator which does not require lubrication and can be manufactured from approved materials for use in pharmaceutical and food processing industries.

It is still another object of my invention to provide a single flow control regulator to provide the control of fluid or gas flow in several tubings at predetermined relative flow rates.

These and other important objects will become apparent from the following description taken in conjunction with the drawings wherein:

FIG. 3 is a top view of the flow control regulator shown in FIG. 1.

FIG. 4 is a side view of the flow control regulator shown in FIG. 1.

FIG. 5 is a sectional view taken on the line 5–5 of FIG. 4.

Figure 1:
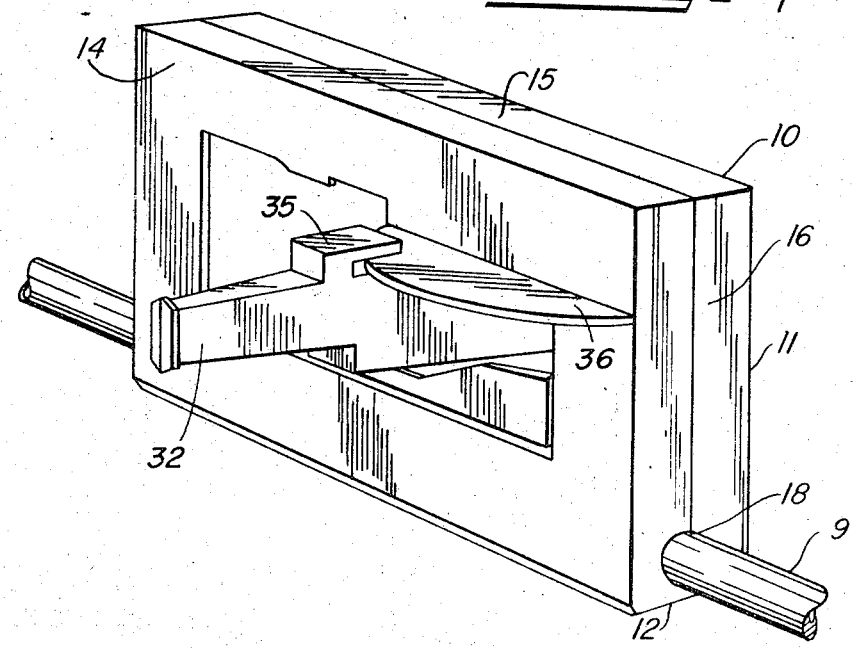
FIG. 1 is a perspective view of a flow control regulator embodying features of this invention and mounted on flexible tubing.

In the exemplary embodiment of the invention as disclosed in FIGS. 1—5, an improved flow regulator generally designated 10 is shown attached to a portion of compressible tubing 9 useful for conducting fluids or gases. Tubing 9 is conventionally formed of resilient material such as rubber or one of many plastics commonly used for such tubing such as vinyl and polyethylene. The flow control regulator of this invention is adaptable to a wide variety of sizes of tubing. The rate of flow of fluid or gas through the lumen of the tube is accurately determined by the setting of regulator 10 which affects this control by suitably constricting the tubing whereby the lumen is adjusted in cross section to permit the desired rate of flow. One particularly advantageous feature of the flow control regulator of this invention is selective constriction of portions of the tubing so that extremely accurate fine flow adjustment is obtained by first constricting opposite side areas of the lumen, thus permitting fine control of a much reduced single area in the central portion of the lumen.

Referring now to FIGS. 1 through 5, the specific construction of a preferred embodiment of my improved flow regulator may be seen. The body 11 comprises a base 12, generally parallel upstanding opposite sidewalls 13 and 14, top 15 generally parallel to base 12, and opposite ends 16 and 17 having opening 18 in end 16 and opening 19 in end 17 for passage of tubing 9.

Body 11 can be molded relatively flat so that base 12 and sidewalls 13 and 14 are in the same plane. The corners between base 12 and sidewalls 13 and 14 are formed by thinning the plastic forming a groove to form hinges 20 and 21. Many plastic materials may be satisfactorily hinged by forming a vee groove at the desired flexing line. Such vee grooves may be formed in the molding operation or by machine. I have not experienced serious difficulties with such hinged joints wearing or breaking under general use, such as in the device of this invention. When polypropylene is molded in this fashion, hinges are formed which appear to be very durable with continued flexing. Accordingly, the box shaped body can be molded relatively flat with upstanding edges which account for approximately half the width of the body. The box shaped body may be formed by simply bringing the opposite side walls in approximate parallel position so that the edges of the top an ends are adjacent. Various types of guides may be used to insure alignment of the top and end surfaces. A preferred embodiment is the guide prongs 22 and 23 which protrude snugly into opposing holes to assure alignment. The body can be firmly retained in the assembled position by any suitable holding means, I have found snap catch 24 to be satisfactory. Assembly of the body in this fashion permits the flow control regulator of my invention to be attached to any desired portion of the tubing, without the necessity of threading the tubing through the flow control regulator. This permits the installation of any type of desired end fittings to the tubing prior to attachment of the flow control regulator. Further, the flow control regulator may be attached to an removed from central portions of tubing, the ends of which are not available. The method of assembly of my flow control regulator completely eliminates expensive assembly operations of threading tubing through the regulator as has been necessary with many prior art devices.

Sidewall 14 can be molded with pressure finger 25 hingedly mounted at hinge 26 so that the entire pressure finger assembly may be bent to approximately 90° to sidewall 14 leaving an accommodating aperture in the wall and the snap catch 24 inserted through a suitable opening in sidewall 13 when the body is assembled. When so assembled, the end of the pressure finger having hinge 26 and snap catch 24 is rigidly mounted to the body so that the other end of the pressure finger, being made of flexible material, may be pivoted or bent about the rigidly fixed end. The pressure finger of a preferred embodiment, as shown in the drawings, is split into three portions forming control fingers 27, 28 and 29. Each control finger portion of the pressure finger has a wedge shaped upper surface 30 which decreases in thickness toward the pivotally mounted end of the pressure finger, and an opposite surface 31 adapted for contacting and depressing tubing which passes between the lower surface of the pressure finger and the bottom of the body. Flow in the tubing is reduced by depression of control fingers 27, 28 and 29 toward base 12, thus reducing the cross-sectional area of the lumen. It is desirable, in order to obtain the fine flow control of small amounts of fluids or gasses through the tubing, to first depress outer control fingers 27 and 29 to greatly reduce the cross section area of the lumen while still maintaining a flow chamber which may be finely adjusted by depression of central control finger 28.

It is obvious that flow control regulators of my invention may be constructed to have any desired number of control fingers, including one, that is, pressure finger 25 need not be split into individual control fingers. One pressure finger satisfactorily controls flow through tubing, when accurate adjustment of small rates of flow are not desired. However, for accurate control of small rates of flow, I prefer to utilize multiple pressure fingers, three being preferred. Using three pressure fingers makes it possible to totally constrict opposite sides of the lumen, reducing the cross section of the lumen to a small single central portion which may be accurately controlled by depression of the central control finger. In this manner, rates of flow of a very small fraction of the total capacity of the tubing may be readily achieved. The outer pressure fingers may be connected to assure uniform operation and prevent any tendency for the outer fingers to spread.

Each control finger has a wedge shaped upper surface. The surface contour of each upper surface, both with regard to angularity and depth, may be formed to control the rate or degree of depression of the individual control finger.

Figure 2:
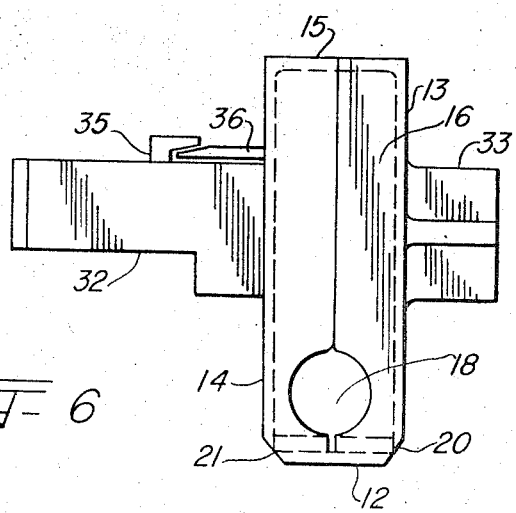
FIG. 2 is an end view of the flow control regulator shown in FIG. 1.

Lever arm 32 is pivotally mounted to bracket 33 through hinge joint 34 after being bent 90° to the sidewall 15 and leaving an accommodating aperture in said wall. The edge of lever arm 32 towards base 12 engages the upper surface 30 of the control fingers 27, 28 and 29 causing the control fingers to depress towards base 12 as arcuate movement of lever arm 32 is continued in the direction indicated as "close" in FIG. 3. Likewise, as lever arm 32 is moved in the direction indicated as "open," the control fingers are forced away from base 12 by the resilient tubing, thus creating a larger lumen in the tubing and permitting greater flow. As shown in the drawings, lever arm 32 has guide angle 35 attached to its upper edge for engagement of guide bar 36 which extends from sidewall 14. As shown in FIG. 2, the upper surface of guide bar 36 is wedge shaped for engagement with lower surface of guide angle 35.

When the desired position of lever arm 32 is reached, force may be exerted toward the body from the outward end of the lever arm causing flexing of locking hinge 37 and concurrent outward or upward deflection of the guide angle, and engagement of the wedged surfaces of guide angle 35 with guide bar 36 edge of the lever arm to firmly lock the lever arm in any desired position.

Figure 6:
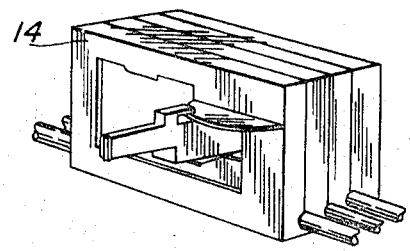
FIG. 6 is a perspective view of another embodiment of a flow control regulator of this invention wherein three flexible tubes are passed through a single flow control regulator for precise predetermined flow regulation in each of the tubes.

It is readily apparent that the flow regulators of my invention may be made in various sizes to accommodate a wide variety of tubing diameters. Likewise, it is readily apparent that the wedge shaped upper surfaces of the control fingers may be formed to a wide variety of contours permitting the obtention of any desired regulation characteristics of the flow of materials through resilient tubing. Additional variations of control may also be achieved by varying the number of control fingers at the end of the pressure finger. The predetermined ratio of flow rates through several tubings may be achieved by simply providing guides for multiple tubing to be positioned along the base of the body and providing multiple control fingers for the tubings as desired, as shown in FIG. 6.

The flow regulator of my invention is particularly well suited as a regulator for parenteral solution administration equipment. For such uses as well as other applications, the base of the body may be equipped with notch 38 which provides for immediate shutoff when desired. The flow regulator of my invention is useful in various chemical laboratory equipment, food processing equipment, pharmaceutical processing equipment, or wherever accurate fine control of the flow of a liquid or gas through a compressible resilient tubing is desired.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A flow regulator for controlling the flow of liquid or gas through compressible resilient tubing, comprising a body having passage for said tubing therethrough; a pressure element having one end pivotally mounted within said body and an opposite end with a plurality of fingers, means on one surface of said fingers forming wedge means and means on an opposite surface adapted for contacting and depressing said tubing against said body; and a lever arm pivotally mounted to said body so that arcuate movement of said lever arm contacts said wedge means for depressing said fingers onto said tubing adjacent said body, thereby controlling the aperture size of said tubing, said wedge means being formed and arranged to depress certain fingers in different positions of the lever arm as it is moved to closed position.

2. A flow regulator according to claim 1 wherein said pressure fingers comprise three control fingers.

3. A flow regulator according to claim 2 wherein the wedge means of the nonadjacent control fingers are higher than the wedge means of the central control finger causing depression of said nonadjacent fingers and then depression of said central finger as the lever arm is moved toward a closed position.

4. A flow regulator according to claim 1 wherein said body comprises side portions and an interconnecting base serving as a hinge to accommodate folding said side portions against each other, means on said one end of the pressure element providing a pivot therefor and releasably securing said body side portions in said folded position in embracing relation to said tubing, and said lever arm pivoted to one of said body portions, and means on the lever arm and the other body portion for holding the lever arm in selected adjusted positions.

5. A flow regulator according to claim 1 and said body comprising opposed portions with notches therein collectively forming said tubing passage, and a flexible base interconnecting said portions along corresponding lateral edges thereof and forming a hinge connection therebetween.

6. A flow regulator according to claim 5 and one body portion having a pressure element accommodating aperture therethrough and the element having a flexible hinge connection at said one end thereof to said one body portion accommodating displacement of said element from said aperture to a position between said portions, and releasable locking means on said one end of said element and the other of said body portions, said releasable locking means and hinge connection providing the aforesaid pivot mounting for the pressure element.

7. The invention according to claim 6 and said other body portion having a lever arm accommodating aperture, and said lever arm, connected at one end to said other body portion at one end of the aperture therein and in operating position extending through both of said apertures transversely of said portions alongside said pressure element.

8. The invention according to claim 5 and said body portions having respectively said pressure element and lever arm formed thereto and said arm and element having operating positions bridging said portions.

9. A flow regulator for controlling the flow of liquid or gas through compressible resilient tubing, comprising a body having passage for said tubing therethrough; a pressure finger having one end pivotally mounted within the body and having one surface forming a wedge and an opposite surface adapted for contacting and depressing said tubing against said body; and a lever arm pivotally mounted to said body so that arcuate movement of said lever arm contacts said wedge surface depressing said finger onto said tubing adjacent said body, thereby controlling the aperture size of said tubing, wherein said lever arm has a guide angle attached thereto for engagement with a guide bar extending from the body, the opposed surfaces of said guide bar, lever and guide angle being shaped to engage each other in wedging relationship, the opposite end of said lever arm having hinge means accommodating movement of said lever arm to wedge said bar between the lever arm and guide angle so that the lever arm may be locked in desired position.

10. A flow regulator formed of flexible plastic material for controlling the flow of liquid and gases through a compressible resilient tubing comprising a body having a pair of opposed portions hingedly connected to each other along one of their edges and defining a tubing admitting passage therebetween, an elongated pressure element having integral means hingedly connected connecting said element along one of its lateral edges and adjacent to one end thereof to one of said body portions and movable on said means to a position extending transversely of said portions alongside said passage, means on the opposite edge of said element adjacent to said one end thereof and on the other of said body portions for releasably locking said element to the other portion in said transverse position, said element deflectible at its other end into pressure contact with said tubing, lever means extending from one of said portions through an aperture in the other portion and disposed along a side of the pressure element opposite said tubing, and means on said other end of the pressure element operably associated with aid lever element for moving the pressure element against the tubing as said lever element is moved toward a closed position.